US011487158B2

(12) United States Patent
Kim et al.

(10) Patent No.: US 11,487,158 B2
(45) Date of Patent: Nov. 1, 2022

(54) BACKLIGHT UNIT, METHOD OF MANUFACTURING THE SAME AND DISPLAY APPARATUS INCLUDING THE SAME

(71) Applicant: SAMSUNG ELECTRONICS CO., LTD., Suwon-si (KR)

(72) Inventors: Hyungsuk Kim, Suwon-si (KR); Jongbin Kim, Suwon-si (KR); Youngmin Lee, Suwon-si (KR); Dukjin Jeon, Suwon-si (KR); Byoungjin Cho, Suwon-si (KR); Sukju Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/210,025

(22) Filed: Mar. 23, 2021

(65) Prior Publication Data

US 2021/0302789 A1    Sep. 30, 2021

Related U.S. Application Data

(60) Provisional application No. 62/994,432, filed on Mar. 25, 2020.

(30) Foreign Application Priority Data

Jun. 1, 2020   (KR) .................. 10-2020-0066000

(51) Int. Cl.
*G02F 1/1335* (2006.01)
*G02F 1/13357* (2006.01)

(52) U.S. Cl.
CPC .. *G02F 1/133612* (2021.01); *G02F 1/133603* (2013.01); *G02F 1/133605* (2013.01); *G02F 1/133607* (2021.01); *G02F 1/133614* (2021.01)

(58) Field of Classification Search
CPC ..................... G02F 1/133603; F21V 7/0091
See application file for complete search history.

(56) References Cited

U.S. PATENT DOCUMENTS 9,405,148 B2   8/2016  Chang et al.
10,107,476 B2  10/2018 Kang
(Continued)

FOREIGN PATENT DOCUMENTS

JP   2004-125824 A   4/2004
JP   2011-90977 A    5/2011
(Continued)

OTHER PUBLICATIONS

International Search Report (PCT/ISA/210) issued by the International Searching Authority in International Application No. PCT/KR2021/003616, dated Jul. 19, 2021.
(Continued)

*Primary Examiner* — Eric T Eide
(74) *Attorney, Agent, or Firm* — Sughrue Mion, PLLC

(57) ABSTRACT

A backlight unit includes a printed circuit board; a light source disposed on the printed circuit board and configured to emit light towards an upper side of the backlight unit; a reflective lens disposed on an upper side of the light source; and a reflective tape attached to the printed circuit board so as to surround the light source. At least a part of the reflective tape has a color different from a color of the light emitted by the light source.

17 Claims, 14 Drawing Sheets

(56) References Cited

U.S. PATENT DOCUMENTS

| | | | |
|---|---|---|---|
| 10,408,422 B2* | 9/2019 | Oh | G02F 1/133607 |
| 10,545,375 B2 | 1/2020 | Jeon et al. | |
| 11,112,648 B2 | 9/2021 | Jeon et al. | |
| 2009/0027893 A1* | 1/2009 | Chang | G02F 1/133603 362/309 |
| 2011/0096265 A1 | 4/2011 | Murakoshi et al. | |
| 2012/0113672 A1* | 5/2012 | Dubrow | G02B 6/0061 362/602 |
| 2015/0219966 A1* | 8/2015 | Song | F21V 7/04 362/97.3 |
| 2015/0268513 A1 | 9/2015 | Chang et al. | |
| 2015/0292708 A1 | 10/2015 | Park et al. | |
| 2016/0161089 A1* | 6/2016 | Jeon | G02F 1/133606 349/64 |
| 2018/0356685 A1* | 12/2018 | Jang | G02F 1/133621 |
| 2019/0243172 A1* | 8/2019 | Gotou | G02F 1/133603 |
| 2020/0133075 A1 | 4/2020 | Jeon et al. | |
| 2021/0325728 A1 | 10/2021 | Jeon et al. | |

FOREIGN PATENT DOCUMENTS

| | | |
|---|---|---|
| KR | 10-2011-0072210 A | 6/2011 |
| KR | 10-2013-0028270 A | 3/2013 |
| KR | 10-1321345 B1 | 10/2013 |
| KR | 10-1386572 B1 | 4/2014 |
| KR | 10-2014-0132571 A | 11/2014 |
| KR | 10-2015-0066847 A | 6/2015 |
| KR | 10-2015-0111021 A | 10/2015 |
| KR | 10-2017-0051650 A | 5/2017 |
| KR | 10-2018-0036216 A | 4/2018 |
| KR | 10-2094829 B1 | 3/2020 |

OTHER PUBLICATIONS

Written Opinion (PCT/ISA/237) issued by the International Searching Authority in International Application No. PCT/KR2021/003616, dated Jul. 19, 2021.

* cited by examiner

BACKLIGHT UNIT, METHOD OF MANUFACTURING THE SAME AND DISPLAY APPARATUS INCLUDING THE SAME

CROSS-REFERENCE TO THE RELATED APPLICATIONS

This application is based on and claims priority under 35 U.S.C. § 119 to U.S. Provisional Patent Application No. 62/994,432, filed on Mar. 25, 2020, in the U.S. Patent and Trademark Office, and Korean Patent Application No. 10-2020-0066000, filed on Jun. 1, 2020, in the Korean Intellectual Property Office, the disclosures of which are incorporated by reference herein in their entireties.

BACKGROUND

1. Field

Embodiments of the disclosure relate to a backlight unit, a method of manufacturing the same, and a display apparatus including the same, and more particularly to a backlight unit having an improved structure for preventing a mura phenomenon, a method of manufacturing the same, and a display apparatus including the same.

2. Description of Related Art

In general, a display apparatus is used in various environments such as a home or an office as a type of an output apparatus for displaying images by receiving an image signal.

Among display apparatuses, a liquid crystal display (LCD) apparatus may not emit light by itself, and accordingly, a backlight unit (BLU) is used as a light source. A recent backlight unit adopts not an edge type, but a direct type, because of high light efficiency and cost savings in manufacturing a light guide plate.

However, the direct type backlight unit had a problem that mura which is stain due to a dark part, a bright part, or colors is generated at a part adjacent to a light source.

SUMMARY

According to one or more embodiments, a backlight unit is provided. The backlight unit includes: a printed circuit board; a light source disposed on the printed circuit board and configured to emit light towards an upper side of the backlight unit; a reflective lens disposed on an upper side of the light source; and a reflective tape attached to the printed circuit board so as to surround the light source, wherein at least a part of the reflective tape has a color different from a color of the light emitted by the light source.

According to an embodiment, the reflective lens has a reflective surface which is positioned to face the printed circuit board and is formed concavely towards the printed circuit board.

According to an embodiment, the reflective tape contains a phosphor.

According to an embodiment, the light, that the light source is configured to emit, is blue light, wherein the reflective tape includes a conversion area having a yellow color, and wherein at least a part of the conversion area contains a phosphor.

According to an embodiment, the conversion area is formed as a plurality of dots disposed radially around a center of the reflective tape.

According to an embodiment, the reflective tape is rotationally symmetrical around the light source.

According to an embodiment, the reflective tape has a height lower than a height of the light source.

According to an embodiment, the backlight unit further includes a reflective sheet attached to the printed circuit board so as to surround the reflective lens.

According to an embodiment, the reflective sheet and the reflective tape are integrally formed as one body.

According to an embodiment, the reflective tape includes: a first conversion area that includes a phosphor and is configured to increase brightness of a first portion of the light, and a second conversion area that includes an ink and is configured to decrease brightness of a second portion of the light.

According to one or more embodiments, a method for manufacturing a backlight unit is provided. The method includes: preparing a printed circuit board; disposing a plurality of light sources on the printed circuit board to be spaced apart from each other; attaching a reflective tape to a first area of the printed circuit board so as to surround the plurality of light sources; disposing a reflective lens on an upper side of the plurality of light sources; and attaching a reflective sheet to a second area of the printed circuit board.

According to an embodiment, the disposing the reflective lens includes disposing the reflective lens on a light source from among the plurality of light sources such that a reflective surface of the reflective lens faces the printed circuit board and is formed concavely towards the printed circuit board.

According to an embodiment, the reflective tape contains a phosphor.

According to an embodiment, the plurality of light sources are configured to emit a blue light, the reflective tape includes a conversion area having a yellow color, and at least a part of the conversion area contains a phosphor.

According to an embodiment, the reflective tape and the reflective sheet are formed integrally as one body, and the attaching the reflective tape and the attaching the reflective sheet are performed at a same time.

According to one or more embodiments, a display apparatus is provided. The display apparatus includes: a display panel; and a backlight unit disposed on a lower side of the display panel. The backlight unit includes: a printed circuit board; a light source disposed on the printed circuit board and configured to emit light towards an upper side of the backlight unit; a reflective lens disposed on an upper side of the light source; and a reflective tape attached to the printed circuit board so as to surround the light source, wherein at least a part of the reflective tape has a color different from a color of the light emitted by the light source.

According to an embodiments, the display apparatus further includes: a quantum dot sheet disposed between the display panel and the backlight unit and configured to change a wavelength of the light.

According to an embodiment, the reflective lens has a reflective surface which is positioned to face the printed circuit board and is formed concavely towards the printed circuit board.

According to an embodiment, the light, that the light source is configured to emit, is blue light, wherein the reflective tape includes a conversion area having a yellow color, and wherein at least a part of the conversion area contains a phosphor.

According to an embodiment, the conversion area is formed as a plurality of dots disposed radially around a center of the reflective tape.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

The examples described below are for understanding of the disclosure and it should be understood that embodiments of the disclosure may be modified and performed variously. In describing embodiments of the disclosure, a detailed description of the related art or a configuration may be omitted when it is determined that such detailed description may unnecessarily obscure the gist of the disclosure. In addition, the accompanying drawings may not be illustrated with actual scales but may be illustrated with enlarged dimensions of some elements, for the understanding of the disclosure.

The terms used in the specification and claims have been selected as general terms as possible in consideration of functions in the embodiments of the disclosure. But, these terms may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, if there are no specific term definitions.

In this disclosure, the terms such as "comprise", "may comprise", "include", or "may include" are used herein to designate a presence of corresponding features (e.g., constituent elements such as number, function, operation, or part), and not to preclude a presence of additional features.

Further, in the specification, elements for describing embodiments of the disclosure are described. However, some elements may be changed or omitted and other elements may be added. In addition, the elements may be divided and disposed in different independent devices.

Embodiments of the disclosure will be described in detail with reference to the accompanying drawings and description in the accompanying drawings, but the disclosure is not limited by the described embodiments.

Hereinafter, non-limiting example embodiments of the disclosure will be described in more detail with reference to the accompanying drawings.

Figure 1:
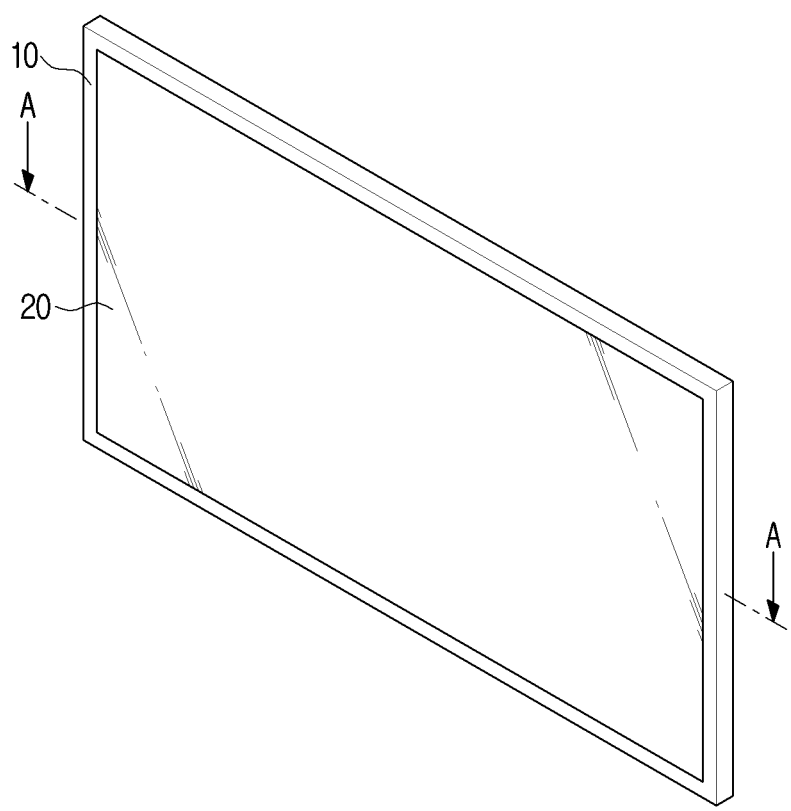
FIG. 1 is a perspective view of a display apparatus according to an embodiment.
Figure 2:
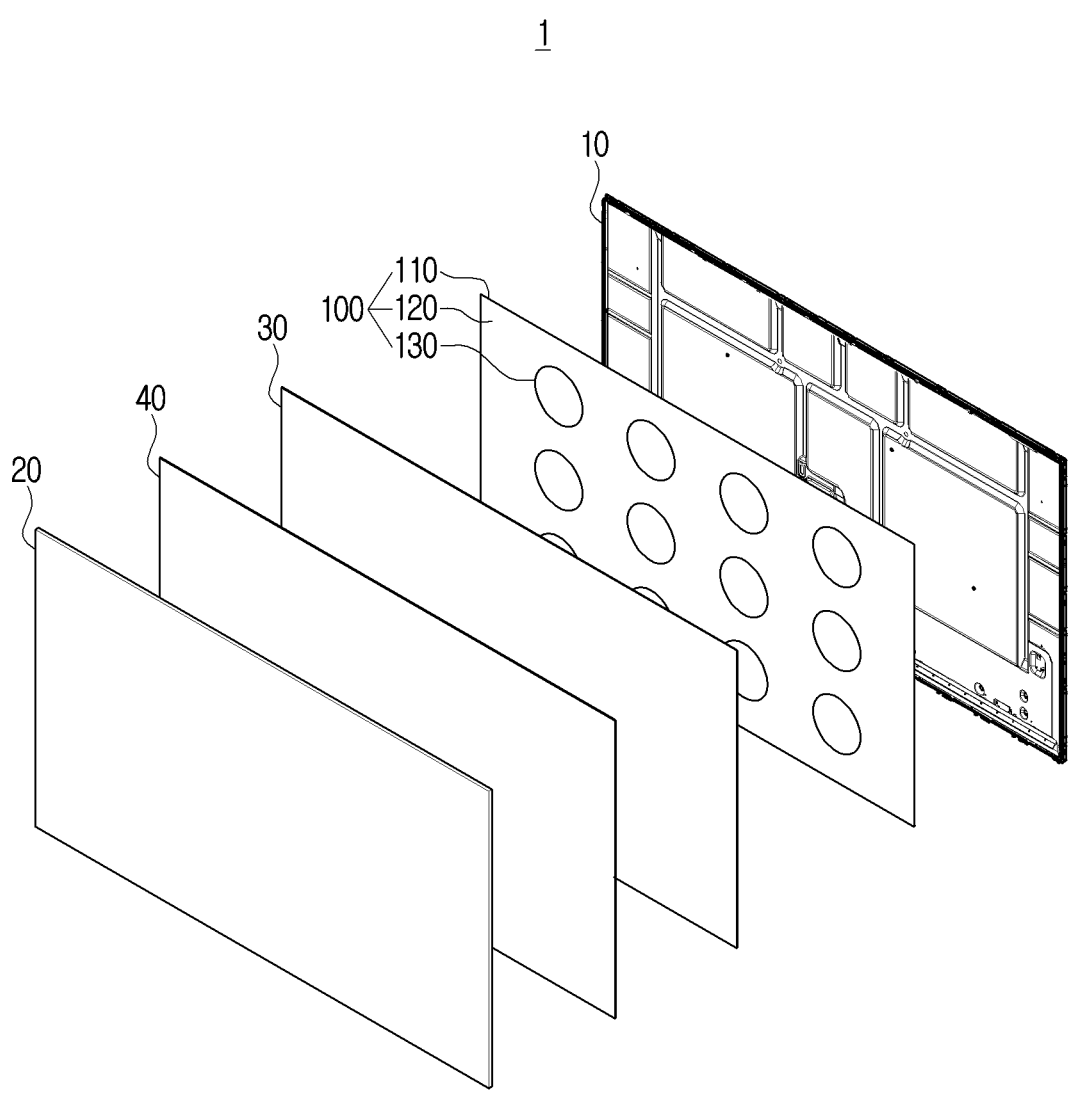
FIG. 2 is an exploded perspective view of a display apparatus.
Figure 3:
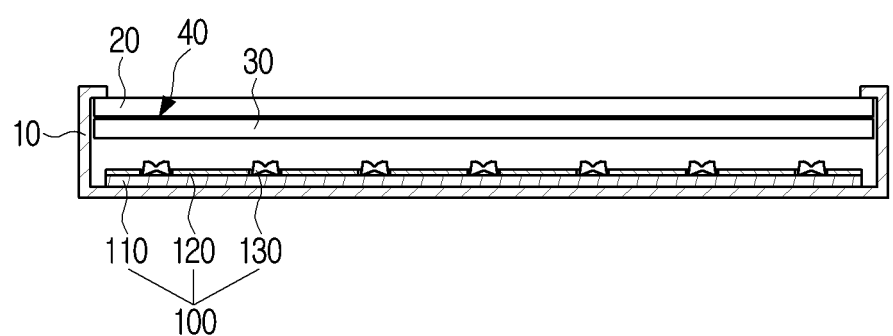
FIG. 3 is a cross-sectional view taken along line A-A of FIG. 1.

FIG. 1 is a perspective view of a display apparatus according to an embodiment. FIG. 2 is an exploded perspective view of a display apparatus. FIG. 3 is a cross-sectional view taken along line A-A of FIG. 1.

Referring to FIGS. 1 to 3, the display apparatus 1 may include a housing 10, a display panel 20, a diffusion sheet 30, an optical sheet 40, and a backlight unit 100.

The display apparatus 1 which will be described below, as an apparatus capable of processing an image signal received from outside and visually displaying the processed image, may be implemented in various forms such as a television, a monitor, a mobile multimedia device, a mobile communication device, and the like, but is not limited in its form, as long as it is an apparatus for displaying an image visually.

According to one or more embodiments of the disclosure, the backlight unit 100 having an improved structure for preventing a mura phenomenon, a method for manufacturing the same, and the display apparatus 1 including the same may be provided.

The housing 10 may accommodate the display panel 20, the diffusion sheet 30, the optical sheet 40, and the backlight unit 100 therein and form an appearance of the display apparatus 1. The housing 10 may include an opening on a front surface so that a front surface of the display panel 20 for displaying an image is exposed to the outside.

The display panel 20 may display various images towards a front part according to an image signal input from the outside and may be configured with a liquid crystal display (LCD) panel. In addition, since the display panel 20 does not emit light by itself, the display panel may receive light from the backlight unit 100.

The display panel 20 may include a color filter substrate (not illustrated) including color filters and a black matrix, and a thin film transistor substrate (not illustrated) including a plurality of thin film transistors, and liquid crystals (not illustrated) may be filled between the color filter substrate and the thin film transistor substrate. For the display panel 20, a liquid crystal panel by a well-known technology may be used, and therefore specific description thereof will be omitted.

The diffusion sheet 30 may be formed in a substantially rectangular flat plate shape having a size corresponding to the display panel 20 and formed of a transmission material for transmitting light. For example, the diffusion sheet 30 may be formed of a transparent plastic such as polymethyl methacrylate (PMMA), polycarbonate (PC), and the like.

The diffusion sheet 30 may uniformly diffuse light emitted from the backlight unit 100 to transfer the light to the optical sheet 40 and the display panel 20, thereby increasing an angle of field and reducing bright dots, bright lines, stains, and the like.

The optical sheet 40 may be disposed between the display panel 20 and the diffusion sheet 30 to minimize wasted light using refraction, reflection, and the like of light, thereby enhancing brightness of light emitted through the diffusion sheet 30 and uniformly diffusing the light.

The optical sheet 40 may have a structure in which at least one of a prism sheet (not illustrated), a protective sheet (not illustrated), a dual brightness enhancement film (DBEF) (not illustrated), and a quantum dot sheet (not illustrated) are laminated in sequence.

The prism sheet and the dual brightness enhancement film may refract or collect light diffused through the diffusion sheet 30 to increase brightness, and the protective sheet may protect the diffusion sheet, the prism sheet, the dual brightness enhancement film, and other components disposed inside the display apparatus 1 from external impact or foreign materials.

The quantum dot sheet may contain quantum dots (QD) for absorbing light in various wavelength ranges and scattering it as light in a desired wavelength range. The quantum dots may be inorganic crystalline materials or fine holes having diameters of several tens nanometers (nm) or less.

For example, if the backlight unit 100 emits blue light, the light transmitted through the quantum dot sheet has a wavelength variously changing according to a size of the quantum dot to express a color with high purity, and therefore, it is possible to enhance color reproducibility of an image implemented on the display panel 20.

The backlight unit 100 may include a printed circuit board 110, a reflective sheet 120, and a plurality of a light source package 130.

The printed circuit board 110 is illustrated in a rectangular plate shape, but is not limited thereto, and may be formed in a bar shape having a narrow width and a long length.

A plurality of the light source package 130 may be installed on an upper surface of the printed circuit board 110 to be spaced apart at regular intervals. In addition, a power supply line (not illustrated) for supplying power to the plurality of the light source package 130 may be formed on the printed circuit board 110.

The reflective sheet 120 may be disposed on a remaining area of the upper surface of the printed circuit board on which the plurality of the light source package 130 are not installed. In other words, the reflective sheet 120 may be disposed so as to cover substantially the entire part of the upper surface of the printed circuit board 110 except for the part where the plurality of the light source package 130 are installed.

The reflective sheet 120 may contain at least one from among a photo solder resist (PSR), polyester terephlhalate (PET), polycarbonate (PC), and polyester, in order to have high reflectivity.

The reflective sheet 120 may reflect a part of light emitted from the light source package 130 and light emitted from a lower surface of the diffusion sheet 30 upwards.

The reflective sheet 120 may include a plurality of holes 121 (refer to FIG. 5) on areas corresponding to the plurality of the light source package 130. Accordingly, the reflective sheet 120 may be easily attached to the printed circuit board 110 without interference with the light source package 130. Specifically, the reflective sheet 120 may be attached to the printed circuit board 110 so as to surround a reflective lens 132 (refer FIG. 6).

The light source package 130 may be formed in a plurality of numbers and disposed to be spaced apart from each other so as to emit light to the upper side of the printed circuit board 110. In other words, the backlight unit 100 may have a direct type structure. The specific configuration of the light source package 130 will be described later in detail.

Figure 4:
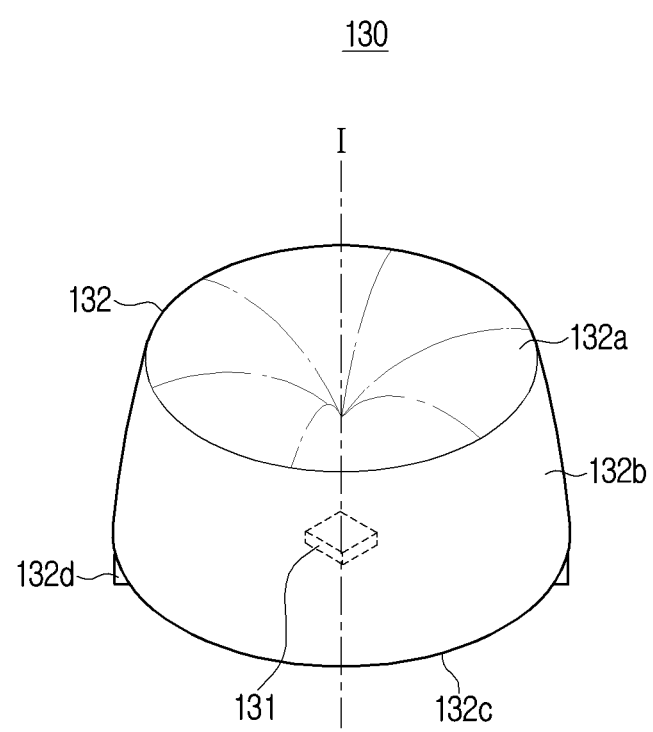
FIG. 4 is a perspective view of a light source package including a light source and a reflective lens.
Figure 5:
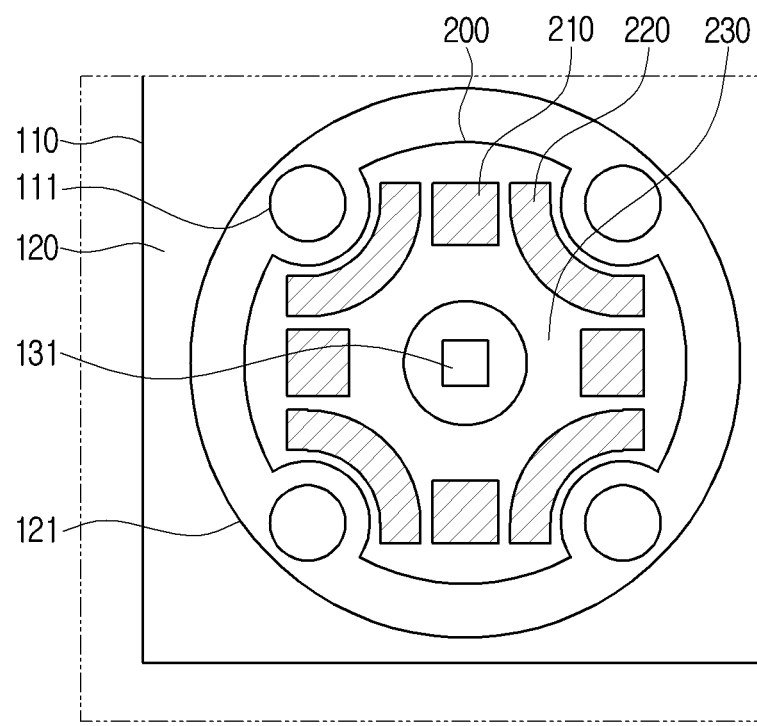
FIG. 5 is a front view of a printed circuit board illustrating a state where a reflective lens is removed.
Figure 6:
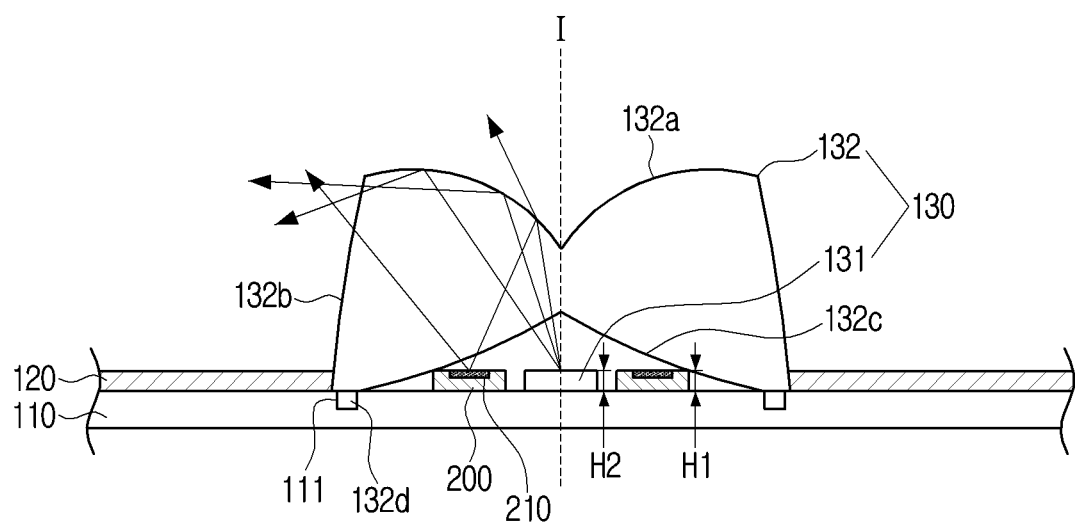
FIG. 6 is an enlarged cross-sectional view of a backlight unit of FIG. 3.

FIG. 4 is a perspective view of a light source package including a light source and a reflective lens. FIG. 5 is a front view of a printed circuit board illustrating a state where a reflective lens is removed. FIG. 6 is an enlarged cross-sectional view of FIG. 3.

The light source package 130 according to an embodiment of the disclosure may include a light source 131, and a reflective lens 132 disposed on an upper side of the light source 131.

The light source 131 may include an LED chip and a sealing material for covering the LED chip. The sealing material may be formed of at least one from among transparent epoxy and silicon, and may further contain a reflective material such as $TiO_2$, in order to prevent the light generated from the LED chip from being absorbed or scattered in the sealing material such as to be eliminated.

The reflective lens 132 may have a substantially conical shape and a longitudinal cross section thereof may have a trapezoid shape with bilateral symmetric structure around a center axis I. In other words, the reflective lens 132 may have a rotationally symmetric structure around the center axis I.

The reflective lens 132 may include a reflective surface 132a which is positioned to face the printed circuit board 110 and formed concavely towards the printed circuit board, a bottom surface 132c which is formed concavely towards the reflective surface 132a, and a side surface 132b connecting the reflective surface 132a and the bottom surface 132c.

The reflective surface 132a and the bottom surface 132c may have a longitudinal cross section with a shape of substantially an arc or normal distribution. Accordingly, it is possible to minimize an area where total reflection occurs on the reflective surface 132a and easily adjust an angle of light totally reflected from the reflective surface 132a spreading to the side surface 132b.

Since the reflective lens 132 has the above shape, the light emitted from the light source 131 may not be emitted to an upper surface of the reflective lens 132 directly, but may spread to the side surface 132b of the reflective lens 132, and accordingly, the light may be uniformly diffused and emitted to the diffusion sheet 30, although the backlight unit 100 has a direct type structure.

Protrusions 132d formed on the bottom surface 132c may be inserted into accommodation holes 111 formed on the printed circuit board 110 to fix the reflective lens 132 to the printed circuit board 110. According to embodiments, the number of protrusions 132d and the accommodation holes 111 is four, but the number thereof is not limited thereto.

A reflective tape 200 may be attached to the printed circuit board 110 to surround the light source 131 and may be disposed on a lower side of the reflective lens 132. Specifically, regarding the light emitted from the light source 131, some of the light may be transmitted through the reflective surface 132a, some of the light may be reflected by the reflective surface 132a and exist to the side surface 132b, and some of the light may be reflected by the reflective surface 132a to be incident to the lower side of the reflective lens 132 again.

The light incident to the lower side of the reflective lens 132 again may not meet the printed circuit board 110, but may meet the reflective tape 200 disposed to surround the light source 131.

It is illustrated in FIG. 6 that the light reflected by the reflective surface 132a is incident to a first conversion area 210 of the reflective tape 200, but this is merely an example, and the light reflected by the reflective surface 132a may be incident to any position among an upper surface 230 of the reflective tape 200.

The reflective tape 200 may include at least one from among photo solder resist (PSR), polyester terephlhalate (PET), polycarbonate (PC), and polyester.

At least a part of the reflective tape 200 may have a color different from the color of the light emitted from the light source 131. In other words, the reflective tape 200 may include an area for absorbing light in a specific wavelength range from the light reflected from the reflective surface 132a of the reflective lens 132.

If the light emitted from the light source 131 is reflected by the reflective tape 200, a color, a color temperature, brightness, and the like of the light may be changed. The reflective tape 200 may be formed to have various colors and patterns so that light is uniformly incident to the rear surface of the diffusion sheet 30, and this may prevent the mura phenomenon.

For example, the light source 131 may emit blue light, the reflective tape 200 may include a conversion area having a yellow color, and at least a part of the conversion area may contain a phosphor.

Specifically, the reflective tape 200 may include a first conversion area 210 and a second conversion area 220 on the upper surface 230, and the first conversion area 210 may contain a phosphor. The first conversion area 210 and the second conversion area 220 may be yellow, and the upper surface 230 may be white.

The phosphor of the first conversion area 210 may be formed as at least one from among epoxy, silicon, deformed silicon, a urethane resin, an oxetan resin, acryl, polycarbonate, and polyimide.

The first conversion area 210 and the second conversion area 220 may be formed by printing the upper surface 230 of the reflective tape 200 with yellow phosphor and yellow ink, respectively.

If blue light emitted from the light source 131 is reflected by the reflective surface 132a and is then reflected by the first conversion area 210 containing the yellow phosphor, the brightness may increase and the color may become yellowish. In addition, if the blue light is reflected by the second conversion area 220 which is formed in yellow, the brightness may decrease and the color may become yellowish.

Specifically, the first conversion area 210 containing the yellow phosphor may be disposed on a part of the reflective tape 200 corresponding to a dark part to increase the brightness of the light, and the second conversion area 220 formed in yellow which does not contain the phosphor may be disposed on a part of the reflective tape 200 corresponding to a bright part to decrease the brightness of the light.

In other words, the reflective tape 200 may be formed with an optimal pattern according to a size of the display apparatus 1 or an interval between the plurality of the light source package 130 so as to prevent the mura phenomenon due to the dark part, the bright part, and the color.

The pattern of the reflective tape 200 illustrated in FIG. 5 is merely an example, and it does not have to contain three colors, and may be formed only with a single color or two colors.

In addition, at least a part of the reflective tape 200 may be formed in black. If the light is reflected by the black area of the reflective tape 200, the brightness of the light may decrease.

A hole may be formed in the center of the reflective tape 200 so as not to interfere with the light source 131, and a plurality of groove shapes may be provided on edges of the reflective tape 200 so as not interfere with the protrusions 132d of the reflective lens 132 and the accommodation holes 111 of the printed circuit board 110.

The reflective tape 200 may be rotationally symmetrical around the light source 131, in the same manner as the reflective lens 132. Accordingly, the light incident to the reflective tape 200 from the reflective surface 132a, that is rotationally symmetrical, may be reflected with the uniformly changed color, brightness, color temperature, and the like of the light.

A height H1 of the reflective tape 200 may be shorter than a height H2 of the light source 131. Therefore, light emitted from the light source 131 diagonally based on the upper side may also smoothly proceed without interference of the reflective tape 200 and loss of light.

Figure 7:
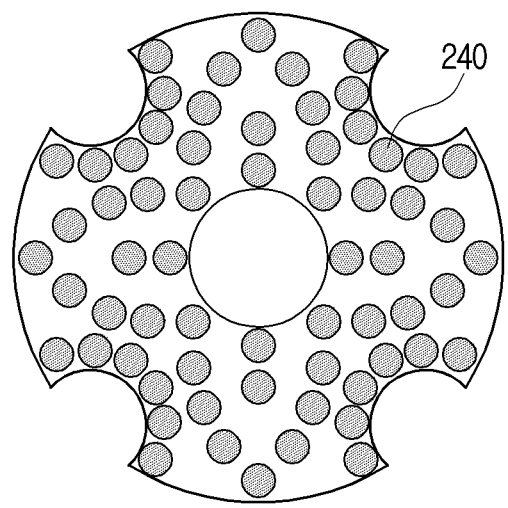
FIG. 7 is a diagram illustrating a reflective tape on which a plurality of dots are disposed.

FIG. 7 is a diagram illustrating the reflective tape 200 on which a plurality of dots 240 are disposed. Referring to FIG. 7, the conversion area of the reflective tape 200 may be formed as the plurality of dots 240 disposed radially around the center of the reflective tape 200.

The plurality of dots 240 may be formed in yellow and at least a part thereof may contains a phosphor. In other words, the dots 240 containing a phosphor may correspond to the first conversion area 210 described above and the other ones of the dots 240 may correspond to the second conversion area 220 described above. The plurality of dots 240 may change the brightness, the color temperature, the color, and the like of light reflected by the reflective tape 200 to prevent the mura phenomenon, in the same manner as the first conversion area 210 and the second conversion area 220 described above.

Specifically, the dots 240 corresponding to the dark part may contain a yellow phosphor to increase the brightness of light, and the dots 240 corresponding to the bright part may be formed not to contain a phosphor, thereby decreasing the brightness of the light. In other words, the plurality of dots 240 may be formed with a material appropriate for preventing the mura phenomenon corresponding to each position.

It is illustrated that the dots 240 are formed in a circular shape and disposed radially around the light source 131, but this is merely an example, and the shape and the arrangement thereof may be variously implemented in order to prevent the mura phenomenon according to the interval between the plurality of the light source 131 or the size of the display apparatus 1.

Figure 8:
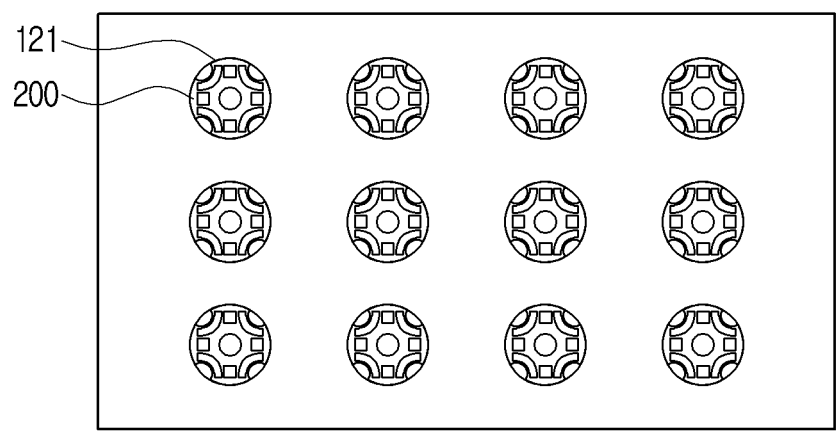
FIG. 8 is a front view illustrating a state where a reflective sheet and a reflective tape are integrally formed.

FIG. 8 is a front view illustrating a state where a reflective sheet and a reflective tape are integrally formed. Referring to FIG. 8, the reflective tape 200 may be disposed at a position corresponding to each of the plurality of holes 121 of the reflective sheet 120, and accordingly, the reflective sheet 120 may be integrally formed with the reflective tape 200.

Therefore, the reflective sheet 120 and the reflective tape 200 may be integrally formed so as to be attached to the printed circuit board 110 at once, rather than attaching separately, and thus it is possible to manufacture the backlight unit 100 more easily.

Figure 9:
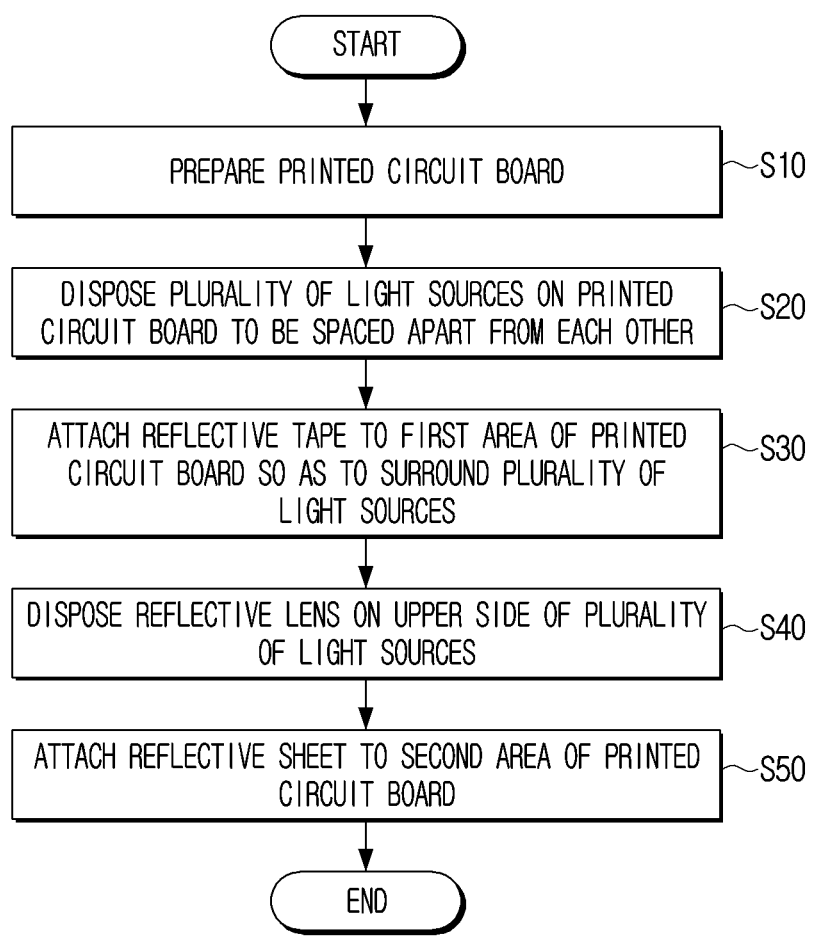
FIG. 9 is a flowchart illustrating a method for manufacturing a backlight unit according to an embodiment.
Figure 10:
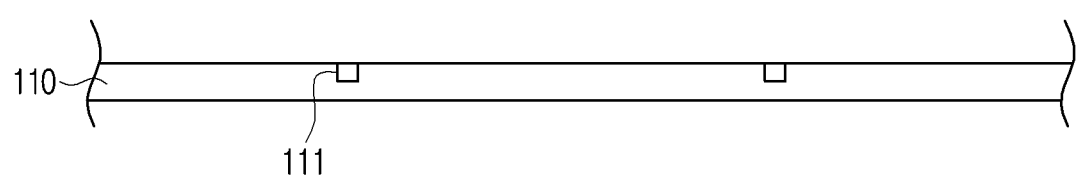
FIG. 10 is a first diagram illustrating a process of manufacturing a backlight unit in sequence.
Figure 11:
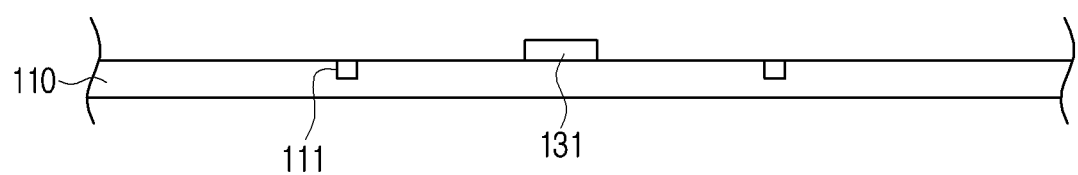
FIG. 11 is a second diagram illustrating the process of manufacturing the backlight unit in sequence.
Figure 12:
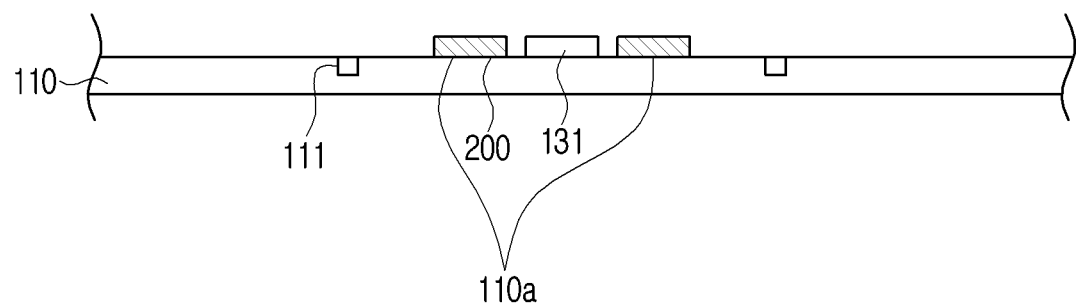
FIG. 12 is a third diagram illustrating the process of manufacturing the backlight unit in sequence.
Figure 13:
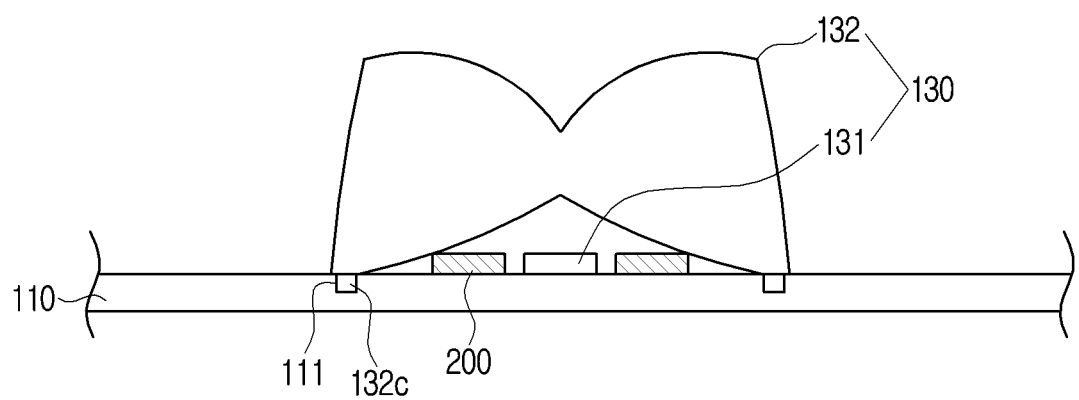
FIG. 13 is a fourth diagram illustrating the process of manufacturing the backlight unit in sequence.
Figure 14:
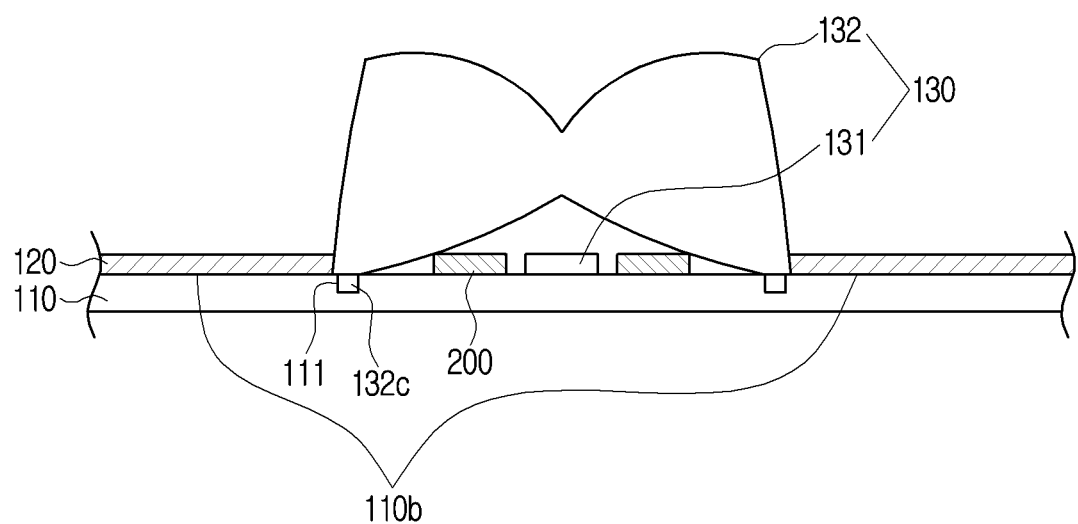
FIG. 14 is a fifth diagram illustrating the process of manufacturing the backlight unit in sequence.

FIG. 9 is a flowchart illustrating a method for manufacturing a backlight unit according to an embodiment. FIGS. 10 to 14 are diagrams illustrating a process of manufacturing a backlight unit in sequence.

Referring to FIGS. 9 to 14, the method for manufacturing the backlight unit according to an embodiment of the disclosure may include a step S10 of preparing the printed circuit board 110, a step S20 of disposing the plurality of the light source 131 on the printed circuit board 110 to be spaced apart from each other, a step S30 of attaching the reflective tape 200 to a first area 110a of the printed circuit board 110 so as to surround the plurality of the light source 131, a step S40 of disposing the reflective lens 132 on an upper side of the plurality of the light source 131, and a step S50 of attaching the reflective sheet 120 to a second area 110b of the printed circuit board 110.

The first area 110a of the printed circuit board 110 may be an area surrounding the light source 131 and corresponding to a lower side of the reflective lens 132, and the second area 110b may be a remaining area excluding the area where the reflective lens 132 is disposed.

Therefore, a PSR coating step with a large reflectivity variation on the printed circuit board 110 and a silkscreen printing step proceeding on the first area 110a with a fluorescent ink or yellow ink may be omitted. Instead of that, since the reflective tape 200 is simply attached to the first area 110a according to the intervals between the plurality of the light source package 130 or various mura phenomena, it is possible to improve productivity of the backlight unit 100.

In addition, as illustrated in FIG. 8, when the reflective sheet 120 and the reflective tape 200 are integrally formed, the step S30 of attaching the reflective tape 200 and the step S50 of attaching the reflective sheet 120 may proceed at the same time, and therefore, it is possible to more efficiently manufacture the backlight unit 100.

While non-limiting example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure. Also, it is intended that such modifications are not to be interpreted independently from technical ideas or prospects of the disclosure.

What is claimed is:

1. A backlight unit comprising:
   a printed circuit board;
   a light source disposed on the printed circuit board and configured to emit light towards an upper side of the backlight unit;
   a reflective lens disposed on an upper side of the light source; and
   a reflective tape attached to the printed circuit board so as to surround the light source,
   wherein at least a part of the reflective tape has a color different from a color of the light emitted by the light source,
   wherein the reflective tape comprises:
      a first conversion area that comprises a phosphor and is configured to increase brightness of a first portion of the light, and
      a second conversion area that comprises an ink and is configured to decrease brightness of a second portion of the light, and
   wherein the reflective tape, including the first conversion area and the second conversion area, is directly below the reflective lens.

2. The backlight unit according to claim 1, wherein the reflective lens has a reflective surface which is positioned to face the printed circuit board and is formed concavely towards the printed circuit board.

3. The backlight unit according to claim 1, wherein the light, that the light source is configured to emit, is blue light,
   wherein the phosphor of the first conversion area is a yellow phosphor, and
   wherein the second conversion area has a yellow color.

4. The backlight unit according to claim 3, wherein the first conversion area and the second conversion area are formed as a plurality of dots disposed radially around a center of the reflective tape.

5. The backlight unit according to claim 1, wherein the reflective tape is rotationally symmetrical around the light source.

6. The backlight unit according to claim 1, wherein the reflective tape has a height lower than a height of the light source.

7. The backlight unit according to claim 1, further comprising:
   a reflective sheet attached to the printed circuit board so as to surround the reflective lens.

8. The backlight unit according to claim 7, wherein the reflective sheet and the reflective tape are integrally formed as one body.

9. A method for manufacturing a backlight unit, the method comprising:
   preparing a printed circuit board;
   disposing a plurality of light sources on the printed circuit board to be spaced apart from each other;
   attaching a reflective tape to a first area of the printed circuit board so as to surround the plurality of light sources;
   disposing a reflective lens on an upper side of the plurality of light sources; and
   attaching a reflective sheet to a second area of the printed circuit board,
   wherein the reflective tape includes:
      a first conversion area that includes a phosphor and is configured to increase brightness of a first portion of light from one of the plurality of light sources, and
      a second conversion area that includes an ink and is configured to decrease brightness of a second portion of the light, and
   wherein the reflective lens is disposed such that the reflective tape, including the first conversion area and the second conversion area, is directly below the reflective lens.

10. The method of claim 9, wherein
    the disposing the reflective lens comprises disposing the reflective lens on a light source from among the plurality of light sources such that a reflective surface of the reflective lens faces the printed circuit board and is formed concavely towards the printed circuit board.

11. The method of claim 9, wherein
    the plurality of light sources are configured to emit a blue light,
    the phosphor of the first conversion area is a yellow phosphor, and
    the second conversion area has a yellow color.

12. The method of claim 9, wherein
    the reflective tape and the reflective sheet are formed integrally as one body, and
    the attaching the reflective tape and the attaching the reflective sheet are performed at a same time.

13. A display apparatus comprising:
    a display panel; and
    a backlight unit disposed on a lower side of the display panel,
    wherein the backlight unit comprises:
       a printed circuit board;
       a light source disposed on the printed circuit board and configured to emit light towards an upper side of the backlight unit;

a reflective lens disposed on an upper side of the light source; and a reflective tape attached to the printed circuit board so as to surround the light source, wherein at least a part of the reflective tape has a color different from a color of the light emitted by the light source, wherein the reflective tape comprises:

a first conversion area that comprises a phosphor and is configured to increase brightness of a first portion of the light, and a second conversion area that comprises an ink and is configured to decrease brightness of a second portion of the light, and wherein the reflective tape, including the first conversion area and the second conversion area, is directly below the reflective lens.

14. The display apparatus according to claim 13, further comprising:

a quantum dot sheet disposed between the display panel and the backlight unit and configured to change a wavelength of the light.

15. The display apparatus according to claim 13, wherein the reflective lens has a reflective surface which is positioned to face the printed circuit board and is formed concavely towards the printed circuit board.

16. The display apparatus according to claim 13, wherein the light, that the light source is configured to emit, is blue light, wherein the phosphor of the first conversion area is a yellow phosphor, and wherein the second conversion area has a yellow color.

17. The display apparatus according to claim 16, wherein the first conversion area and the second conversion area are formed as a plurality of dots disposed radially around a center of the reflective tape.

* * * * *